United States Patent Office 3,065,999
Patented Nov. 27, 1962

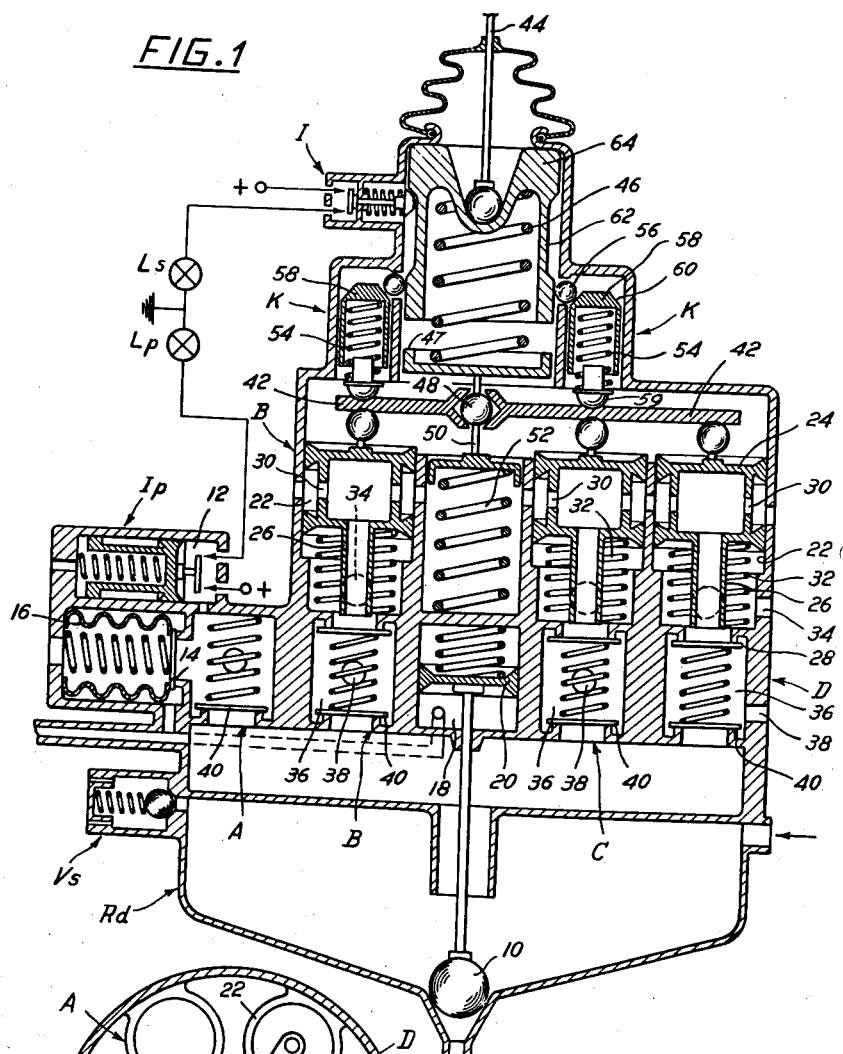

3,065,999
PRESSURE AIR DISTRIBUTOR
Giuseppe Alfieri, Milan, Italy, assignor to Fabbrica Italiana Magneti Marelli S.p.A., Milan, Italy, a firm
Filed Oct. 8, 1959, Ser. No. 845,149
Claims priority, application Italy Oct. 25, 1958
4 Claims. (Cl. 303—53)

The present invention relates to a unitary pressure air distributor comprising a plurality of distributor sections and auxiliary signalling and control devices particularly for vehicles, which comprises substantially a combined brake pedal and push rod connected to a composite rocker lever for the activation of the separate distrbutor sections, said lever being operated by such push rod through a regulation spring.

Pressure air distributors with a plurality of sections are already known. They comprise in a single unit the whole depurator-regulator equipment for elimination of moisture and foreign matter from the compressed air, the condensate outlet and drain valve, the safety valve and the low pressure indicator. The present invention relates to a distributor of such kind but constituting a particularly compact unit which is adapted for vertical positioning directly under the brake pedal in such a way as to avoid any mechanical linkage with the driving transmission.

The device according to the invention is characterized in that a brake pedal push rod defines a vertical axis about which the distributor sections are symmetrically arranged and about which a unitary composite rocker lever is also symmetrically disposed. The composite rocker lever is operated in a downward direction as the brake pedal push rod is depressed. The lever is formed with a radially extending arm for operation of each distributor, each arm terminating in a driving end above a plunger in one distributor. Advance operation of one or more distributor sections is obtained by means of advance devices acting upon the corresponding rocker lever driving ends.

Further features and characteristics of the present invention will be evident from the following specification taken in connection with the accompanying drawing, wherein:

FIG. 1 shows, in diagrammatic form, a developed vertical mid-section of a triple-section unitary pressure air distributor with four sections; and, FIG. 2 is a diagrammatic plan view of the distributor illustrated in FIG. 1.

In the embodiment illustrated, there are four distributor sections, A, B, C and D, as developed on a vertical plane in FIG. 1 and shown in their true position in FIG. 2.

The section A is provided for auxiliary service. It is in communication with the chamber 12 of a pressure regulator I$p$ within which the compressor pressure is established. The pressure regulator I$p$ includes a pressure actuated switchwhich is closed to signal to the driver whenever the pressure in the reservoir of the braking system is below a given limit at which the braking is no longer effective. Closure of the pressure actuated switch completes a circuit for the pressure signalling lamp L$p$ from the positive battery terminal + through the switch and the light L$p$ to the ground battery terminal. As illustrated in FIG. 1, a predetermined pressure within the section A compresses a bellows 16 to open a valve 14 and permits a flow from section A into a chamber 18 to expand the volume of said chamber and causing the slidable piston 20 therein to open the drain valve 10 of a depurator-regulator equipment R$d$ at the bottom of the pressure air distributor. The depurator-regulator equipment and its safety valve V$s$ are of known construction and further reference thereto will be omitted.

The sections B, C, D are the true distributor sections of the apparatus and each of them includes substantially a cylindrical chamber having an upper chamber 22 and a lower chamber 36. A plunger piston 24 slides in chamber 22 and is provided on its upper end with outlet ports 30 and on its lower end with a plunger rod 26 to cause operation of an inlet valve 28. Each upper chamber 22 is in communication with the associated braking member (not shown) by means of a pipe 34. The inlet valve 28 separates chambers 22 and 36 and the pressure fluid enters chamber 22 after flowing through the underlying chamber 36.

The chamber 36 is in communication, in its turn, with the associated section tank (not shown) through a pipe 38 and with the feeding chamber of regulator-depurator by means of a check valve 40.

The three distributor sections B, C, D of the described embodiment are arranged around the axis of the push rod at 120° one from another. The sections are operated on the top thereof by means of a rocker lever acting upon the tops of the respective plungers 24. The rocking lever is in turn under the control of a brake pedal push rod 44 through the regulation spring 46. The composite rocker lever has three arms 42, one for each distributor, to cause operation of the distributor sections B, C and D (FIG. 2).

The connection between the push rod 44 and the composite rocker lever 42 whereby the rocker lever is operated will now be described. The lower end of the push rod 44 seats within a central depression at the top of an axially slidable control plunger 64. A regulation spring 46 has its upper end seated upon the control plunger 64 and extends downwardly therefrom to a cup 47 within which the lower end of the spring 3 is seated, all coaxially of the axis of the push rod 44 (FIG. 1). The upper end of a control rod 50 is centrally fixed to the bottom of the cup 47, extending axially downwardly therefrom and resiliently restrained against downward action by a reaction spring 52, which is seated in a central seat in the frame of the unitary distributor.

Thus, when the brake pedal depresses the push rod 44, the control plunger 64 is moved downwardly and the regulation spring 46 moves the cup 47 and the control rod 50 downwardly against the resilient action of the reaction spring 52. When the brake pedal is released, the reaction spring 52 returns the control rod 50, the cup 47 and the control plunger 64 to their original positions.

The composite rocker lever 42 is centrally pivoted to the control rod 50, as by being pivoted to a ball 48 fixed to the rod 50 (FIG. 1). Accordingly, when the push rod 44 is moved downwardly, and with it the control rod 50 and ball 48, the composite rocker lever 42 is moved downwardly. The plunger 24 of the distributor sections B, C and D are thereupon depressed by the composite rocker arm to open their respective valves 28 and permit flow of compressed air to the respective brakes.

The control according to the invention, with a single middle regulation spring 46, allows embodiment therein of particular advance controls for one, two or more distributor sections. Said embodiment is such that the initial advance of a particular distributor action is gradually reduced to increase the pressure of the braking fluid to full force, with the result that perfect operation balance between the distributors is achieved.

The advance controls of particular distributor sections are also arranged around the axis of the push rod 44, and are positioned over the ends of the rocker lever 42 acting upon the distributors to be advanced.

FIG. 1 illustrates diagrammatically two such advance controls, i.e. K and K, an advance control for advancing the action of the distributor section B with respect to the action of another distributor section or other distributor sections, and an advance control for advancing the action of the distributor section C.

Each advance control K, as best seen in FIG. 1 of the drawings, comprises a coil spring 54 prestressed between an advance control plunger 58 vertically slidable in a cavity of the frame of the unitary pressure air distributor coaxially above the distributor section to be advanced and a movable abutment 59 in contact with the corresponding arm of the composite rocker lever 42. The cavity in which the plunger 58 is vertically slidable has a transverse bore at its upper end connecting with the vertical cavity in which the control plunger 64 slides; and a ball 56 is positioned in this transverse bore for contact with the advance control plunger 58 and the external surface of the control plunger 64.

The upper end of the advance control plunger 58 has a conical inclined surface 60 upon which the ball 56 may bear to hold the plunger 58 downwardly and pressure of the external surface of the control plunger 64 which slides upon the cavity wall holds the ball 56 against this inclined surface 60 to maintain the movable abutment 59 against the arm of the composite lever 42 with full force. The control plunger 64 is outwardly recessed, as at 62, above its contact with the ball 56 when the push rod 44 is not depressed; the entrance to recess 62 has an inclined outer surface to permit the ball 56 to enter the recess 62 gradually as the control plunger 64 is moved toward braking position. Thus, upon depression of the control plunger 64 the inclined surface 60 of the advance control plunger 58, under the action of the spring 54, moves the ball 56 gradually into the recess 62, as the control plunger moves to the top of the recess in which it slides. At the same time, the spring 7 expands, and the force exerted upon the end of the composite rocker lever by the advance control is reduced.

Accordingly, when the brake pedal is depressed, the push rod 44 is moved downwardly moving the control rod 50 downwardly as described. As the control rod 50 moves downwardly it moves the composite rocker lever 42 downwardly to act upon the plungers 24 of the distributor sections and to open the valves 28 of the respective distributor sections. Normally, all of the plungers 24 will be simultaneously acted upon with the result that all of the valves 28 will be opened at once. Where, however, an advance control K acts upon an end of a composite rocker lever arm 42, acting upon the plunger 24 of the corresponding distributor section, the force of that advance control is added to the force normally exerted by such arm 42. Because of the central pivoting 48 of the composite rocker lever, the plunger 24 of the subject distributor section is moved before the plungers 24 of the other sections and action of that section is advanced.

As the push rod 44 is further depressed, the ball 56 slides over the inclined outer surface and into the recess 62 of the control plunger 64 under the pressure of the inclined surface 60 at the upper end of the advance control plunger 58, and the advance control plunger 58 moves to the top of the cavity in which it slides. Such movement of the advance control plunger 58 permits the spring 54 to elongate, and gradually reduce the pressure of the advance control upon the rocker lever 42. Thereafter the composite rocker lever acts normally.

Where action of the distributor sections is to be sequentially advanced, this result may be obtained by different prestressing of the springs 54 of the respective advance controls.

It is to be remarked that the plunger recess 62 may be used in obvious manner for control of the conventional switch I, to control opening and closing of the circuit of a stop signalling lamp Ls. The depression of the control plunger 64 by the brake pedal rod 44 causes lateral movement of the biased switch arm of the switch I to complete a circuit from the positive battery terminal + through the switch I and the stop light Ls to the battery ground terminal.

The advance devices are advantageous to carry out a correct braking of heavy vehicles such as a tractor and associated trailer. In this case the distributor section connected to the trailer has to perform the braking action in advance of that of the tractor rear section, which is in its turn to be operated in advance of that of the tractor front section.

Inasmuch as this invention is subject to various modifications and changes in structural detail, it is intended that all matter contained in the foregoing description and shown on the drawing shall be interpreted as illustrative and not in a limiting sense.

What is claimed is:

1. A multiple unit type compressed air distributor mechanism for operating a plurality of sets of brakes, said mechanism comprising a frame having therein a central vertical cavity, a second vertical cavity displaced from the central vertical cavity and a transverse bore connecting the top of the second vertical cavity with the central vertical cavity, a control plunger slidable in the central vertical cavity and having an external wall recess, a brake pedal, a push rod connected to said brake pedal for axial displacement responsive to depression of said brake pedal, said push rod being coaxial with said central vertical cavity and said control plunger and being in contact with the top of said control plunger for depressing the same, a cup slidable within the central vertical cavity in the frame of said mechanism beneath said control plunger, a regulating spring compressed between said control plunger and said cup for resiliently separating them, a control rod fixed to said cup and extending axially downwardly therefrom, a unitary composite rocker lever centrally pivoted to said control rod, said lever having a plurality of radially extending arms, and a distributor section disposed beneath each arm of said lever for actuation thereby when said push rod is depressed, one of said sections being a section the action of which is to be advanced and such section being positioned beneath the second vertical cavity in said frame, in combination with an advance control plunger vertically slidable in the second vertical cavity of said frame, said advance control plunger having a conical inclined surface at its upper end, a movable abutment in contact with the upper surface of the lever arm for actuation of the distributor section whose action is to be advanced, a spring prestressed between said advance control plunger and said movable abutment to stress said movable abutment against said rocker lever arm, and a ball in the transverse bore of said frame bearing against the inclined upper surface of said advance control plunger to hold said advance control plunger against said spring and maintain the prestressed condition of said spring, the external wall of said control plunger holding said ball against the conical inclined surface at the upper end of said advance control plunger, and the external wall recess of said control plunger permitting said advance plunger to move said ball along the transverse bore and to move to the top of said second vertical cavity and permit said advance control spring to elongate, thereby reducing the advance control force of said movable abutment upon the lever arm upon which it bears.

2. A compressed air distributor mechanism according to claim 1, wherein the external wall recess of said control plunger has an inclined surface which permits the ball to enter the external wall recess gradually and the advance control spring to expand gradually.

3. A multiple unit type compressed air distributor mechanism for operating a plurality of sets of brakes, said mechanism comprising a brake pedal, a frame, a push rod positioned within said frame having one end extending outwardly thereof and connected to the brake pedal for axial displacement responsive to depression of said brake pedal, a plurality of distributor sections arranged symmetrically about the axis of said push rod, a control rod operatively connected to the push rod, a unitary composite rocker lever symmetrically disposed with respect to the axis of said push rod centrally pivoted to said control rod, a vertical cavity within the frame substantially coaxial with a distributor section, a transverse bore at the upper end of said cavity, an advance control plunger having a conical inclined surface at its upper end slidable within the cavity, a movable abutment in contact with the upper surface of the rocker arm, a spring prestressed between the advance control plunger and the movable abutment to stress said movable abutment against said rocker lever arm, and a ball in the transverse bore of said frame bearing against the inclined upper surface of the advance control plunger to hold said advance control plunger against the spring and maintain the prestressed condition of said spring.

4. A compressed air distributor mechanism according to claim 1 wherein the control plunger is provided with an inclined surface, a stop light switch mounted on the frame in proximity to the control plunger, said stop light switch having an actuator engageable by the inclined surface of the control plunger to thereby actuate the stop light switch in response to axial displacement of the control plunger.

References Cited in the file of this patent

UNITED STATES PATENTS

| | | |
|---|---|---|
| 2,615,464 | Hughey | Oct. 28, 1952 |
| 2,680,654 | Edge et al. | June 8, 1954 |

FOREIGN PATENTS

| | | |
|---|---|---|
| 887,616 | France | Aug. 16, 1943 |
| 1,144,667 | France | Apr. 29, 1957 |
| 315,375 | Italy | Feb. 23, 1934 |